US008867155B2

(12) United States Patent
Okubo

(10) Patent No.: US 8,867,155 B2
(45) Date of Patent: Oct. 21, 2014

(54) APPARATUS AND METHOD FOR INTER-TRACK INTERFERENCE CANCELLATION FROM REPRODUCED DATA BASED ON POLARITY AND RATIO OF BITS

(71) Applicant: Kabushiki Kaisha Toshiba, Tokyo (JP)

(72) Inventor: Tomokazu Okubo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/764,855

(22) Filed: Feb. 12, 2013

(65) Prior Publication Data

US 2014/0104715 A1    Apr. 17, 2014

(30) Foreign Application Priority Data

Oct. 16, 2012    (JP) .................................. 2012-228710

(51) Int. Cl.
G11B 20/10    (2006.01)
(52) U.S. Cl.
CPC ................................ *G11B 20/10046* (2013.01)
USPC ........................................................... 360/39
(58) Field of Classification Search
None
See application file for complete search history.

(56) References Cited

U.S. PATENT DOCUMENTS 5,729,514 A    3/1998    Horigome et al.
2013/0215528 A1*    8/2013    Okubo et al. .................. 360/53

FOREIGN PATENT DOCUMENTS

JP    2000-113595 A    4/2000
JP    2011-018404 A    1/2011

* cited by examiner

*Primary Examiner* — Wayne Young
*Assistant Examiner* — Mark Fischer
(74) *Attorney, Agent, or Firm* — Posz Law Group, PLC

(57) ABSTRACT

According to one embodiment, a data reproduction apparatus includes a decoder, a cancellation process module and a calculator. The cancellation process module cancels, from equalized-waveform data of a read signal, the interference between a signal read from a first track and a signal read form a second track adjacent to the first track. The calculator calculates, for a specific window, a first cancellation coefficient necessary to cancel the interference. The calculator further calculates a second cancellation coefficient by correcting the first cancellation coefficient based on a ratio of the number of adjacent bits of opposite polarity to the number of all bits in the specific window.

20 Claims, 6 Drawing Sheets

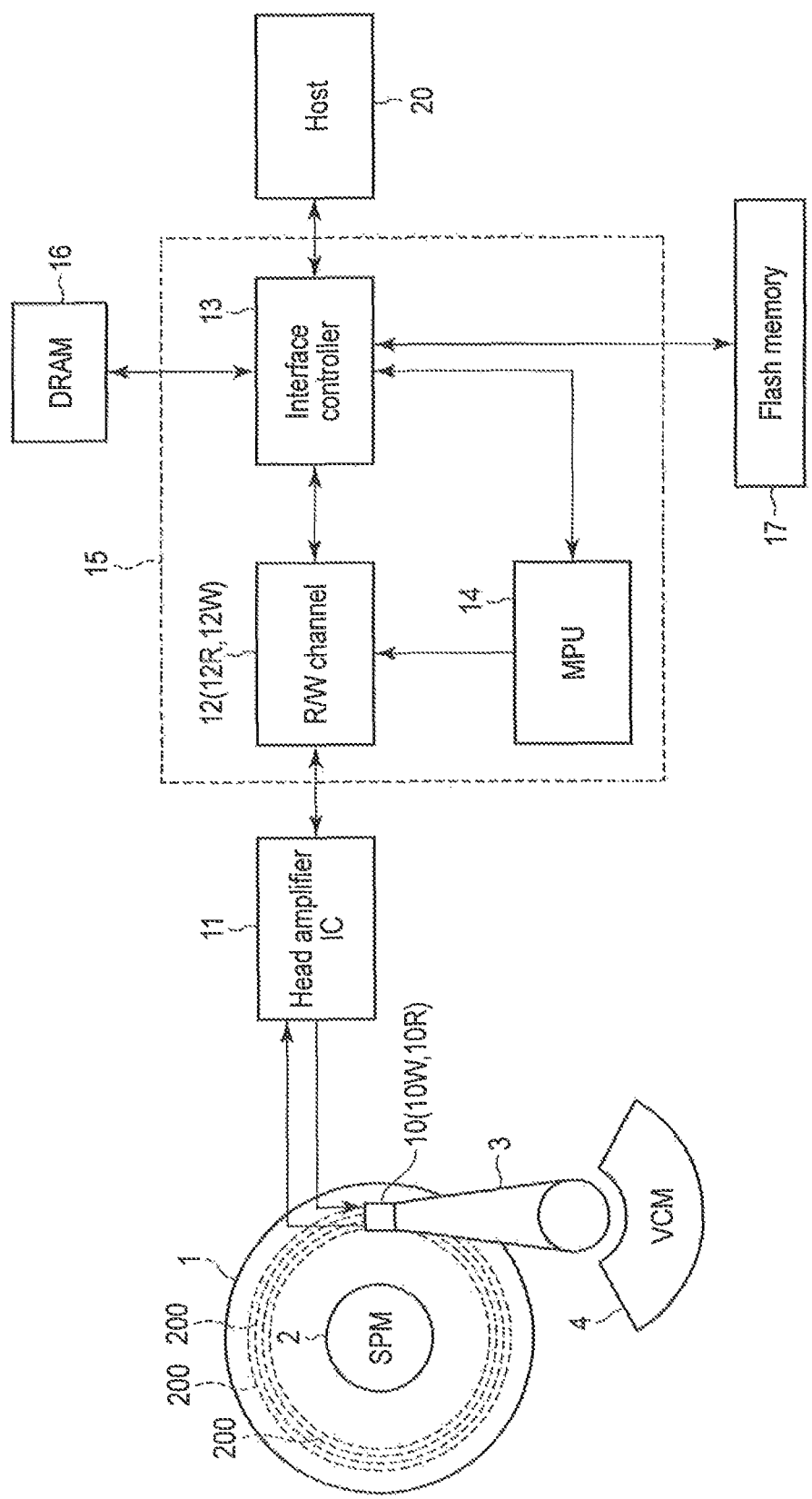
F I G. 1

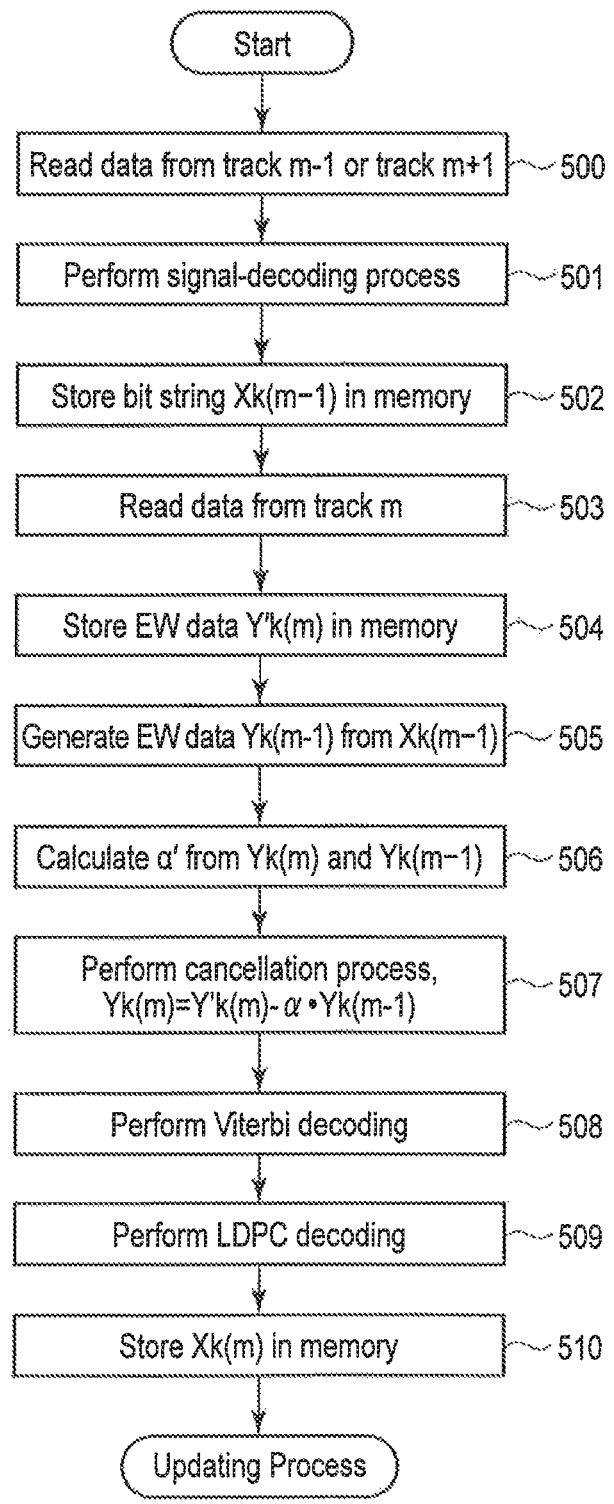
F I G. 5

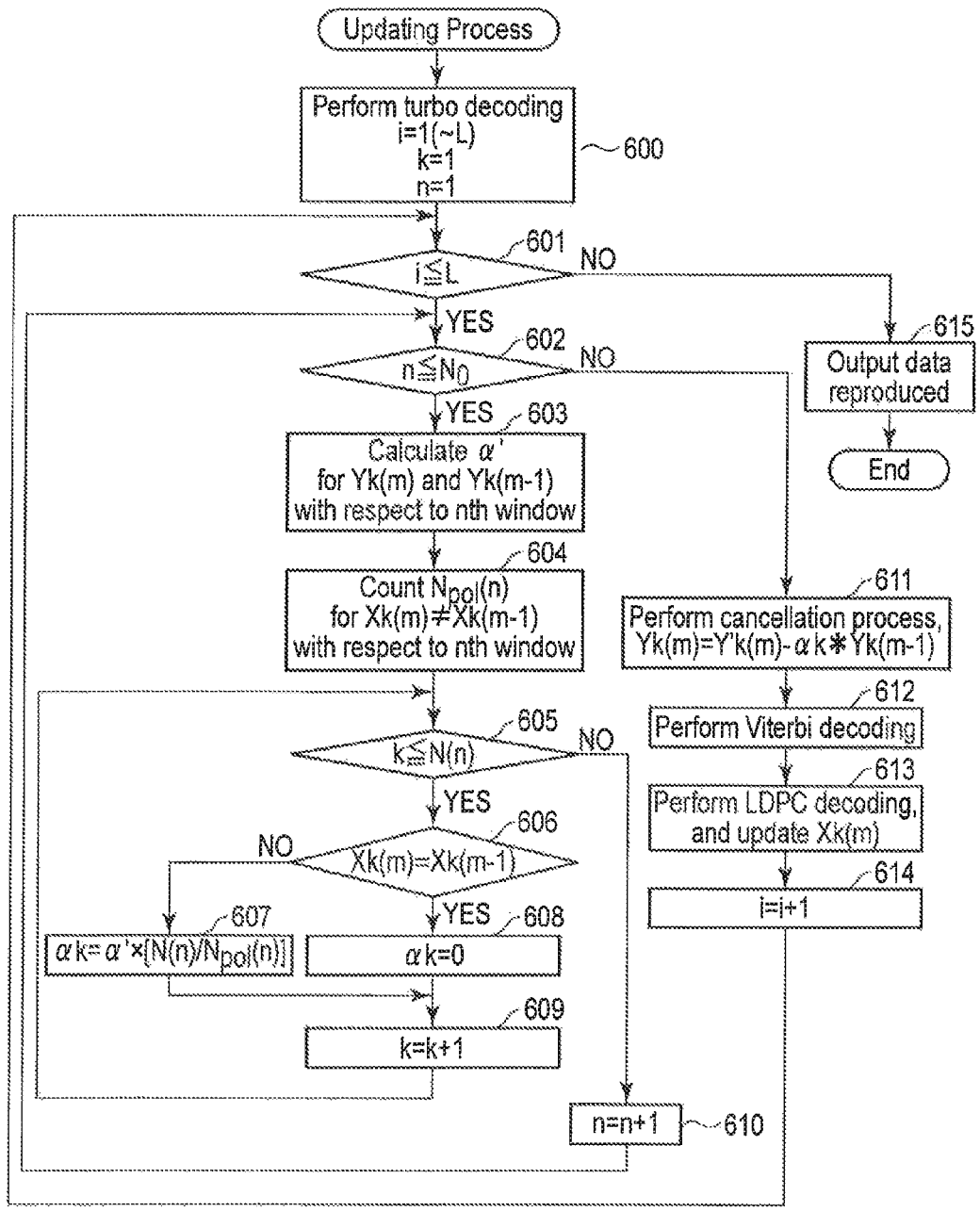
F I G. 6

APPARATUS AND METHOD FOR INTER-TRACK INTERFERENCE CANCELLATION FROM REPRODUCED DATA BASED ON POLARITY AND RATIO OF BITS

CROSS-REFERENCE TO RELATED APPLICATIONS

This application is based upon and claims the benefit of priority from Japanese Patent Application No. 2012-228710, filed Oct. 16, 2012, the entire contents of which are incorporated herein by reference.

FIELD

Embodiments described herein relate generally to a data reproduction apparatus, a disk storage apparatus and a method for reproducing data.

BACKGROUND

In recent years, data tracks (hereinafter referred to as "tracks" in some cases) are provided at density ever increasing on a disk used, as recording medium, in the disk storage apparatuses such as hard disk drives (HDDs). The space between any adjacent tracks has therefore decreased. As a result, when a signal magnetically recorded on a track is read, it may be interfered with a signal magnetically recorded on any adjacent track. Such interference between the signals recorded on an adjacent track is sometimes called inter-track interference (ITI).

Because of the ITI, a signal read from a track may not be correctly decoded to reproduce data in some cases. In order to cancel the ITI, techniques have been developed to perform an ITI cancellation process, thereby to remove the interfering component of the signal recorded on the adjacent from the signal read from the track.

In most cases, the ITI cancellation process is performed in units of windows, each having a length less than or equal to, for example, one sector, in order to reduce the influence of frequency fluctuations. The window is a unit by which to detect those parts of reproduced data (bit string) which should be subjected to the ITI cancellation. As the window size decreases from one-sector length (for example, 4000 bits or more), the cancellation coefficient (or cancellation weight) will more likely deviate from the optimal value, as confirmed in the art. Consequently, the ITI may not be cancelled as much as desired.

BRIEF DESCRIPTION OF THE DRAWINGS

FIG. 1 is a block diagram for explaining the configuration of a disk drive according to an embodiment;

FIG. 5 is a flowchart for explaining the cancellation process performed in the embodiment; and FIG. 6 is a flowchart for explaining also the cancellation process performed in the embodiment.

DETAILED DESCRIPTION

Figure 2:
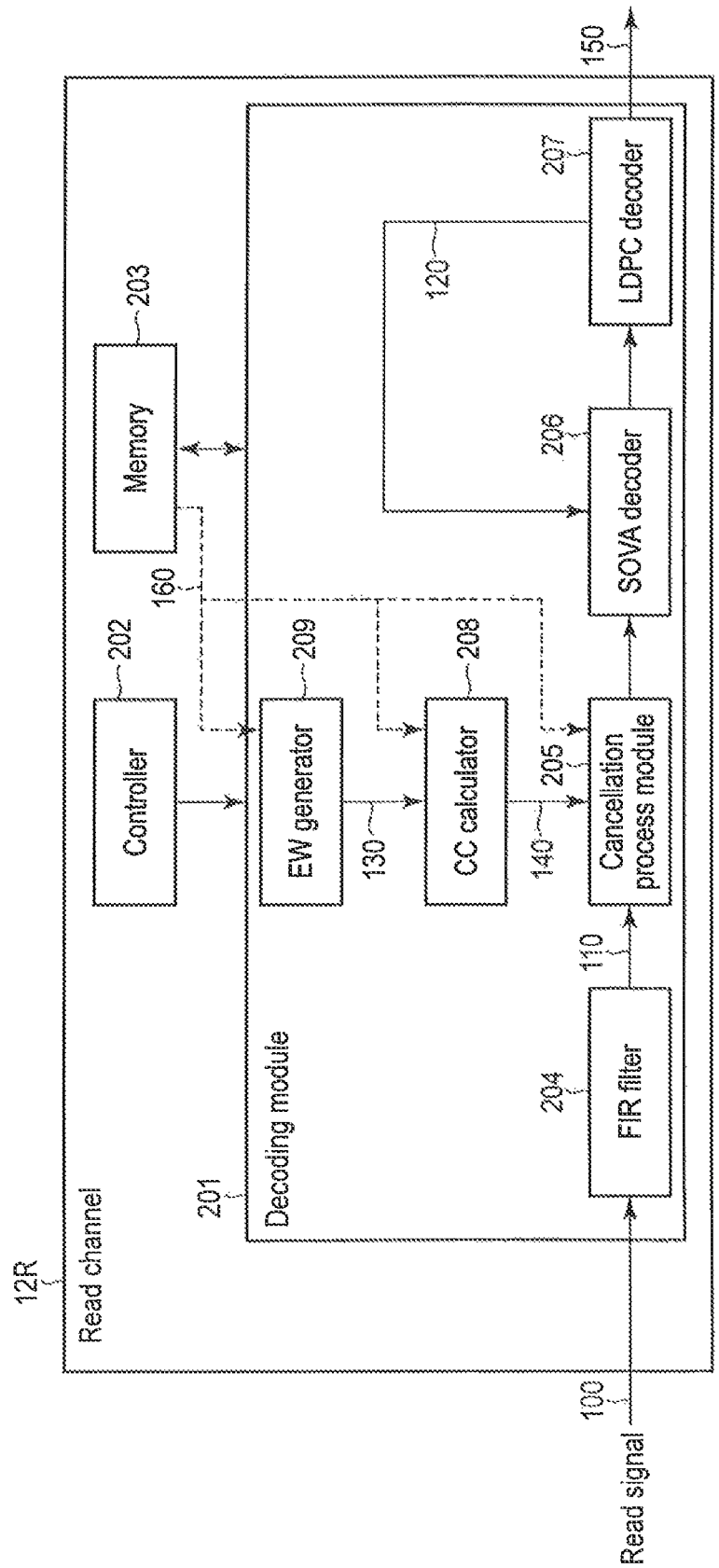
FIG. 2 is a block diagram for explaining the configuration of a read channel a disk drive according to the embodiment.

In general, according to one embodiment, a data reproduction apparatus includes a decoder, a cancellation process module and a calculator. The decoder receives a read signal read from any track on a disk, and to decode bit-string data based on equalized-waveform data generated by equalizing the waveform of the read signal. The cancellation process module cancels, from the equalized-waveform data, the interference between a signal read from a first track and a signal read form a second track adjacent to the first track. The calculator calculates, for a specific window, a first cancellation coefficient necessary in the cancellation process module to cancel the interference. The calculator further calculates a second cancellation coefficient by correcting the first cancellation coefficient based on a ratio of the number of adjacent bits of opposite polarity to the number of all bits in the specific window.

Various embodiments will be described hereinafter with reference to the accompanying drawings.

[Configuration of the Disk Drive]

FIG. 1 is a block diagram showing the major components of a disk storage apparatus (hereinafter referred to as a "disk drive") according to an embodiment.

As shown in FIG. 1, the disk drive comprises three major components, i.e., a head-disk assembly (HDA), a head amplifier integrated circuit (hereinafter referred to as "head amplifier IC") 11, and a hard disk controller (HDC) 15.

The HDA has a disk 1, a spindle motor (SPM) 2, an arm 3, and a voice coil motor (VCM) 4. The disk 1 is storage medium. The arm 3 holds a head 10. The spindle motor 2 rotates the disk 1. The arm 3 and the VCM 4 constitute an actuator. The actuator moves the head 10 to a designated position over the disk 1 as the VCM 4 rotates the arm 3 holding the head 10. On the disk 1, a plurality of data tracks 200 are provided, in which of which data may be recorded. The head 10 comprises a slider (i.e., main body), a write head 10W and a read head 10R. The write head 10W and read head 10R are mounted on the slider. The read head 10R reads data from the data tracks 200 provided on the disk 1. The write head 10W writes data on the disk 1.

The head amplifier IC 11 has a read amplifier and a write driver. The read amplifier any read signal generated by the read head 10R and supplies the read signal to a read/write (R/W) channel 12 that is provided in the HDC 15. The write driver supplies the write head 10W with a write current that corresponds to the write data output from the R/W channel 12.

The HDC 15 is a single-chip integrated circuit that includes an interface controller 13 and a microprocessor (MPU) 14, in addition to the R/W channel 12. The R/W channel 12 includes a read channel 12R and a write channel 12W. The read channel 12R processes read signals to decode data, as will be described later. The write channel 12W processes write signals to encode data.

The interface controller 13 controls the data transfer between a host 20 and the R/W channel 12. More specifically, the interface controller 13 controls a buffer memory (DRAM) 16, causing the same to store read data and write data temporarily, thereby controlling the data transfer. Further, the interface controller 13 controls a flash memory 17, causing the same to function as a cache area for holding data temporarily.

The MPU 14 is the main controller of the disk drive. The MPU 14 controls the VCM 4, performing a servo control to position the head 10 over the disk 1. Further, the MPU 14 controls the R/W channel 12, thereby controlling the recording and reproduction of data.

FIG. 2 is a block diagram showing the configuration of the read channel 12R included in the R/W channel 12.

As will be described later, the read channel 12R functions to perform an ITI cancellation process of removing inter-track interference (ITI). The read channel 12R is a data reproduction apparatus designed to process a signal read from a data track, thereby to decoding data from the signal thus read. The read channel 12R has the function of cancelling the inter-track interference (ITI) during the data reproduction process.

As shown in FIG. 2, the read channel 12R comprises three major components, i.e., a decoding module 201, a controller 202, and a memory 203. As will be described later, the controller 202 uses the memory 203, controlling the decoding module 201. So controlled, the decoding module 201 performs a data reproduction process (i.e., data decoding process) that includes the ITI cancellation process.

The decoding module 201 includes a finite impulse response (FIR) filter 204, a cancellation process module 205, a soft-output Viterbi algorithm (SOVA) decoder 206, a low-density parity check (LDPC) decoder 207, a correlation coefficient (CC) calculator 208, and an equalization waveform (EW) generator 209.

The FIR filter 204 includes an analog-to-digital converter (ADC) and samples a read signal (analog signal) 100 supplied from the head amplifier IC 11. The FIR filter 204 is a digital filter configured to perform a waveform equalization process on a value string acquired by sampling the read signal 100, making the value string acquire characteristic similar to the partial response (PR) characteristic. The read signal 100 is a signal read by the read head 10R from a data track 200 provided on the disk 1 and then amplified by the head amplifier IC 11.

The cancellation process module 205 is a module configured to perform a process of cancelling inter-track interference. More precisely, the cancellation process module 205 removes a crosstalk (i.e., signal interference) at an adjacent track, from the equalized waveform 110 (i.e., digital signal) output from the FIR filter 204. As will be described later, the controller 202 causes the memory 203 to store the equalized waveform 110 temporarily, enabling the cancellation process module 205 to perform the ITI cancellation process.

The SOVA decoder 206 is a Viterbi decoder that uses a soft-output Viterbi algorithm (SOVA), thereby to decode the equalized-waveform 110 from which the cancellation process module 205 has cancelled the ITI. The LDPC decoder 207 performs a decoding process (i.e., error detecting/correcting process) on the low-density parity check code for the bit string the SOVA decoder 206 has decoded.

The SOVA decoder 206 and the LDPC decoder 207 constitute a so-called "turbo-decoding system" that repeats the decoding process L times. The LDPC decoder 207 outputs a bit string representing the repeated decoding result 120 and a bit string representing the final decoding result 150. The repeated decoding result (i.e., bit string) 120 is temporarily stored in the memory 203 before it is used in the ITI cancellation process.

The CC calculator 208 calculates a cancellation coefficient (cancellation weight string) 140 in units of windows, from the equalized-waveform string 130 for an adjacent track and the equalized-waveform string 160 for the track form which to read data, which has been read from the memory 203. All data about equalized-waveform strings, read from the memory 203, are designated as "160," for convenience of description.

The cancellation coefficient 140 is a coefficient for cancelling the crosstalk (i.e., signal interference) at the adjacent track, in the equalized-waveform string 160 for the track form which to read data. The equalization waveform (EW) generator 209 generates an equalized-waveform string (EW data) 130 from the bit string 160 at the adjacent track (i.e., track m−1 or track m+1), which string has been read from the memory 203. The equalized-waveform string 130 is output to the CC calculator 208.

[Data Reproduction Process]

The data reproduction process including the step of setting a cancellation coefficient, according to the embodiment, will be explained with reference to FIGS. 3A and 3B and FIG. 4 to FIG. 6.

Figures 3A, 3B:
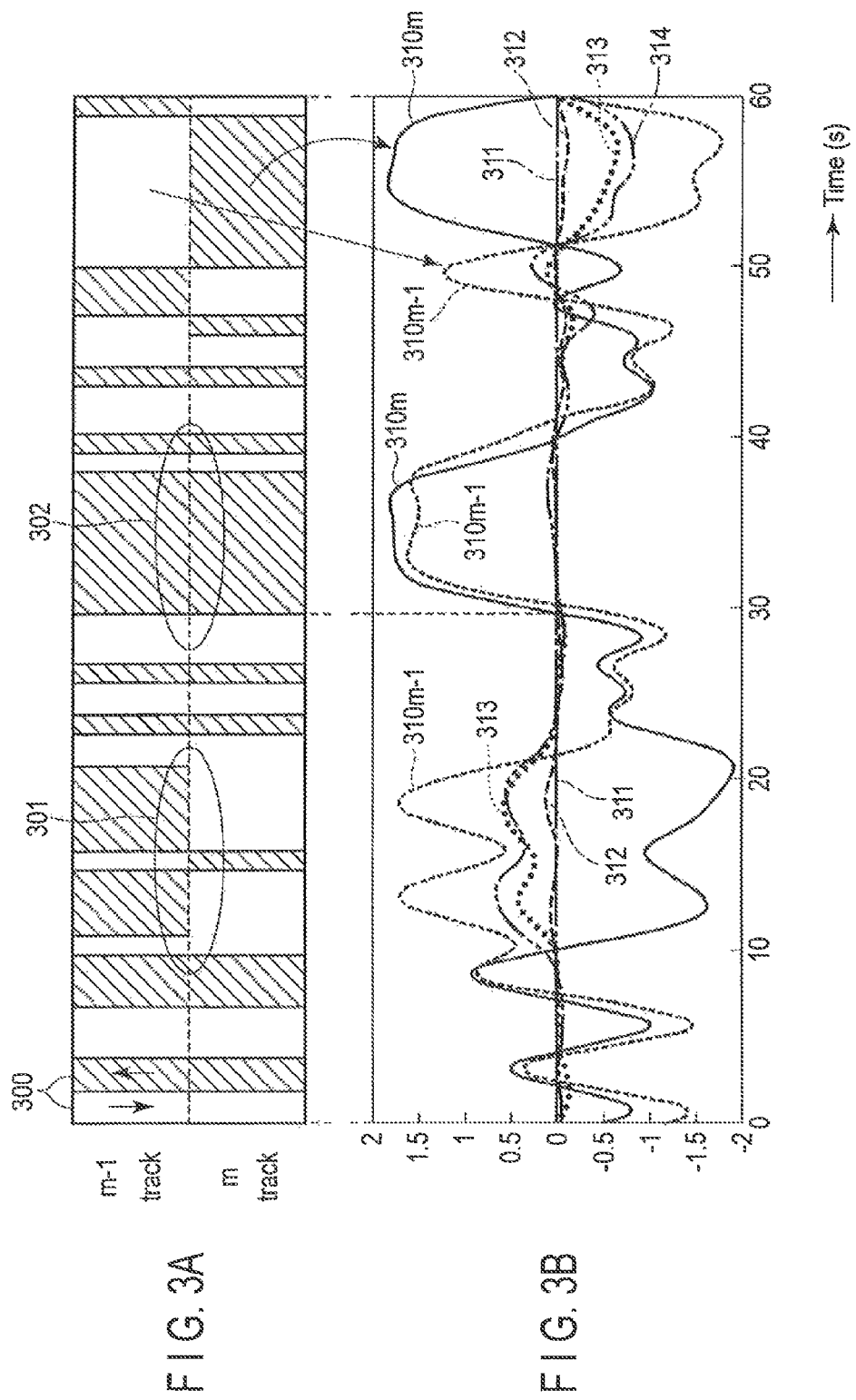
FIGS. 3A and 3B are diagrams for explaining the ITI characteristic according to the embodiment.

FIG. 3A shows the data recorded in two tracks adjacent to each other on the disk 1, more precisely the track m from which to read data, and the track m−1 adjacent there to the track m. Note that the data reproduction process (including the step of setting a cancellation coefficient) according to the embodiment can be performed in the same way on the data recorded on the track m and the other adjacent track m+1.

In FIG. 3A, "300" designates bits, while the arrows indicate the polarities (0 and 1) of the bits 300. Further, "301" designates a region holding two adjacent tracks (i.e., tracks m and m−1) including two bit strings of the opposite polarities, respectively, and "302" designates a region holding two adjacent tracks (i.e., tracks m and m−1) including two bit strings of the same polarity, respectively.

FIG. 3B is a diagram showing the result of simulation, indicating which how the bit polarity depends on the interference between the adjacent tracks. As seen from FIG. 3B, a waveform 310$m$ is reproduced if no inter-track interference occurs when a signal is read from the track m, and a waveform 310$m$−1 is reproduced if no inter-track interference occurs when a signal is read from the adjacent track m−1.

The waveform interferences 311 to 314 with the signal read from the track m differ in accordance with the track pitch (interval Tp) at which the adjacent tracks are arranged. The waveform interference 311 will occur if the track pitch Tp is 100 nm. The waveform interference 312 will occur if the track pitch Tp is 70 nm. The waveform interference 313 will occur if the track pitch Tp is 55 nm. The waveform interference 314 will occur if the track pitch Tp is 50 nm. The waveform interferences 311 to 315 are determined by simulating the waveforms reproduced for the track m. Each waveform difference is the difference between the waveform reproduced for each track pitch and the waveform reproduced to the track m in the absence of inter-track interference.

As seen from FIG. 3B, the shorter the track pitch, the larger the interference will be. Therefore, the interference the adjacent track m−1 imposes on the track m is not constant, but changes in accordance with whether the adjacent bits have the same polarity or different polarities. If the adjacent bits have the same polarity, almost no interference is observed. In this case, the cancellation process module 205 sets the cancellation coefficient to 0. If the adjacent bits have different polarities, the cancellation process module 205 sets a cancellation coefficient ($\alpha$), performing the ITI cancellation process.

Figure 4:
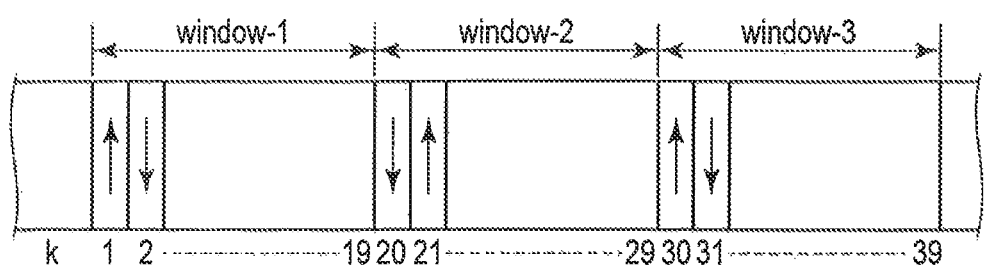
FIG. 4 is a diagram for explaining the cancellation process performed window by window in the embodiment.

As shown in FIG. 4, the cancellation process module 205 of the embodiment performs the ITI cancellation process in units of windows, each having a length less than or equal to, for example, one sector, in order to reduce the influence of frequency fluctuations. In FIG. 4, "k" is the bit label or bit position of the bit string reproduced.

As described above, as the window size decreases to, for example, 100 bits that is smaller than one-sector length, the cancellation coefficient $\alpha$ (or cancellation weight) will probably deviate from the optimal value. This is because, as the window size decreases, the bit string of the track from which to read data and the bit string of the track adjacent to this track cannot be independent of each other. In other words, more windows will most likely occur, in which any two adjacent bits have the same polarity or the opposite polarities. To be more specific, if the window size has one-sector length, the probability that any two adjacent bits have the same polarity is about 0.5, and the deviation is almost zero. By contrast, as the window size decreases from one-sector length, the probability that any two adjacent bits have the same polarity will greatly change.

This is why the cancellation process module 205 of this embodiment is configured to set an optimal cancellation coefficient α in accordance with the probability that any two adjacent bits have the same polarity in the bit string contained in the window, in order to perform the ITI cancellation process each window having one-sector length or a shorter length. As can be seen from FIG. 2, the cancellation process module 205 receives each bit string 160 read from the memory 203 and determines whether any two adjacent bits have the same polarity or opposite polarities.

How the read channel 12R operates will be explained in detail, with reference to the flowchart of FIG. 6.

First, the read channel 12R, which is the data reproduction apparatus according to the embodiment, decodes data from the signal the read head 10R has read from the disk 1. The read channel 12R need not perform the ITI cancellation process if the LDPC decoder 207 has output normally decoded data 150.

In most disk drives, if a read error occurs, a read retry is started in order to read data again. If the read error has resulted from inter-track interference (ITI), the ITI cancellation process of the embodiment will be effective. How the ITI cancellation process is performed in the embodiment to reproduce data during, for example, the read retry, will be explained. Hence, to achieve normal data reading not involving any read retry, the cancellation process module 205 and CC calculator 208 may be stopped, because they are designed to accomplish the ITI cancellation process.

In the read channel 12R, the decoding module 201 reproduces data at the track m−1 adjacent to the track from which to read data, as shown in FIG. 5, under the control of the controller 202 (Block 500). The adjacent track may be replaced by the track m+1 as described before. In the embodiment, the track m from which to read data is a track that should undergo a read retry. The MPU 14 controls various components, first causing the read head 10R to read a read signal from the disk 1 and finally transferring the signal to the read channel 12R.

The decoding module 201 then performs a signal-decoding process, first using the FIR filter 204 and last using the LDPC decoder 207, while disabling the cancellation process module 205. (Block 501). The LDPC decoder 207 outputs a bit string Xk(m−1) as decoded output 120 from the adjacent track m−1. The controller 202 stores the bit string Xk(m−1) temporarily in the memory 203 (Block 502). Of symbol Xk(m−1), "k" in indicates the bit label (i.e., bit position) of the bit string.

Next, the decoding module 201 reproduces data from the track m from which to read data, under the control of the controller 202 (Block 503). The FIR filter 204 performs a waveform equalization process on the signal 100 read from the track m, and outputs a equalized-waveform string Y'k(m) (hereinafter referred to as "EW data"). The controller 202 stores the EW data Y'k(m) temporarily in the memory 203 (Block 504). The EW data Y'k(m) corresponds to the bit string 160 read from the memory 203, as can be understood from FIG. 2.

Then, the controller 202 controls the EW generator 209, which generates EW data Yk(m−1) from the bit string Xk(m−1) read from the adjacent track m−1 and stored in the memory 203 (Block 505). Thus, as seen from FIG. 2, the EW data Yk(m−1) is equalized-waveform string 130. Note that the bit string Xk(m−1) is the data 160 read from the memory 203.

The controller 202 controls the CC calculator 208, which calculates a correlation coefficient α' from the EW data Y'k(m) at the track m and the EW data Yk(m−1) at the adjacent track m−1 (Block 506). That is, the CC calculator 208 receives the equalized-waveform bit strings 160 and 130 and calculates the correlation coefficient α'. The CC calculator 208 provisionally sets the cancellation coefficient α to the cancellation process module 205, the cancellation coefficient α uniquely corresponding to the correlation coefficient α' (namely, α=α').

The decoding module 201 can therefore provisionally output the bit string Xk(m) at the track m, which is initially unknown. That is, the cancellation process module 205 uses the cancellation coefficient α so set, performing ITI cancellation, thereby removing the ITI component at the adjacent track m−1 from the equalized-waveform 110 at the track m, which has been output from the decoding module 201 (Block 507). In this case, the ITI cancellation process is equivalent to a process of calculating "Yk(m)−Y'k(m)−α*Yk(m−1)." At the time of performing this calculating process, the bit string Xk(m) at the track m is a provisional one. The cancellation process module 205 therefore performs the calculating process, without taking the polarity difference between the adjacent bits into consideration.

In the decoding module 201, the SOVA decoder 206 performs Viterbi decoding on the EW data Yk(m) at the track m, which has undergone the cancellation process performed by the cancellation process module 205 (Block 508). Also in the decoding module 201, the LDPC decoder 207 performs a decoding process, outputting the bit string Xk(m) at the track m, as provisional bit string (containing errors) decoded in the $0^{th}$ decoding (Block 509). The controller 202 stores the bit string Xk(m) at the track m, temporarily in the memory 203 (Block 510).

As shown in FIG. 6, the decoding module 201 performs, as an updating process following the first decoding, a cancellation process in consideration of the polarity difference between the provisional bit string Xk(m) at the track m and the bit string Xk(m−1) at the adjacent track m−1.

First, the controller 202 sets a value i for monitoring the number of times the decoding is repeated, a bit label k for the bit string and the initial value (=1) of the label n of the window, during the turbo-decoding process in which the decoding is repeated a preset number of times (Block 600). The controller 202 repeats the decoding until the value i exceeds preset value L (Block 601).

Then, the controller 202 controls the CC calculator 208, which calculates the correlation coefficient α' for the EW data Yk(m) at the track m and the EW data Yk(m−1) at the adjacent track m−1. More precisely, the CC calculator 208 divides the EW data of a prescribed window size N(n) (where n is window label ranging from 0 to No), into EW data Yk(m) and EW data Yk(m−1), thereby calculating a correlation coefficient αn' for the $n^{th}$ window (Blocks 602 and 603).

That is, if the window size is N(n) bits in the cancellation process, the correlation coefficient αn' for the $n^{th}$ window will be calculates as follows:

$$\alpha'_n = \operatorname*{argmin}_{a} \left[ \sum_{k=\{n\text{-}th\ window\}} [Y_k(m) - aY_k(m-1)] \cdot Y_k(m-1) \right] \quad (1)$$

wherein the equation (1) gives "a" when the value in brackets becomes minimum, and "k=n$^{th}$ window" is the bit label (i.e., k$^{th}$ bit) of the n$^{th}$ window.

The correlation coefficient αn' has been calculated on the assumption that all bits in the window are interfered to the same degree. In fact, however, the correlation coefficient αn' has been calculated including region that the adjacent bits are the same polarity. The cancellation coefficient (cancellation weight) is under-evaluated.

The under-evaluated part can be corrected with a ratio of the number Npol(n) of adjacent bits of opposite polarity to the number N(n) of all bits in the window. This is why the CC calculator 208 calculates the cancellation coefficient for the n$^{th}$ window corrected in this embodiment, by using the following equation:

$$\alpha_n = \alpha'_n \times \frac{N(n)}{N_{pol}(n)} \quad (2)$$

where the number Npol(n) is not 0 (that is, Npol(n)≠0).

The CC calculator 208 compares the bit string Xk(m) read from the memory 203, with the bit string Xk(m−1), and determines the number Npol(n) of bits of the opposite polarity (Block 604). The bit string Xk(m) is, in the n$^{th}$ window, the provisional bit string Xk(m) at the track m. The bit string Xk(m−1) is that at the track m−1 adjacent to the track m.

The CC calculator 208 compares each bit with the next one in terms of polarity, and sets the cancellation coefficient α to zero if the bits compared have the same polarity (Blocks 605, 606 and 608). If the bits compared have the opposite polarities, the CC calculator 208 sets the cancellation coefficient α to the value calculated by using the equation (2) (Blocks 605, 606 and 607).

The controller 202 controls the CC calculator 208, which performs the above-described calculation on all bits k in the window (Block 609). The CC calculator 208 further controls the CC calculator 208, causing the same to perform the above-described calculation on all widows (N(n), N=No) in one sector (Block 610).

The CC calculator 208 sets the cancellation coefficient α, thus calculated, to the cancellation process module 205 (if NO in Block 602). The cancellation process module 205 uses the cancellation coefficient α set to it, performing a process of cancelling the ITI component at the adjacent track m−1 from the EW data Y'k(m) at the track m (Block 611). At this point, the cancellation process module 205 receives every bit string 160 read from the memory 203 and determines whether any two adjacent bits have the same polarity or opposite polarities.

In the decoding module 201, the SOVA decoder 206 performs Viterbi decoding on the EW data Yk(m) at the track m of one sector, which has undergone the cancellation process in the cancellation process module 205 (Block 612). Further, in the decoding module 201, the LDPC decoder 207 performs the decoding process, outputting the bit string Xk(m) at the track m, which has been updated in the decoding performed first (Block 613).

The controller 202 stores the bit string Xk(m) at the track m, temporarily in the memory 203, repeats decoding a number L (i=L) of times, and updates the bit string Xk(m) at the track m and the number Npol(n) of bits of the opposite polarity, one after another (Block 614). As a result, the decoding module 201 outputs, as reproduced data, the bit string Xk(m) at the track m, which has been decoded at high precision (Block 615).

As has been described, the read channel 12R according to the embodiment can reproduce high-precision data, by removing the ITI component from the data at the track m, for example during the read retry. This is because the cancellation coefficient for achieving the cancellation process in units of windows is corrected in accordance with the ratio of bits, each opposite in polarity to the adjacent bit, to all bits in one window, and a cancellation coefficient optimal can therefore be set to each window. Since an optimal cancellation coefficient can be set in the disk drive, in the process of reproducing data, the ITI component can be reliably removed. In other words, the method for reproducing data, according to the embodiment, can reproduce data reliably, and can help to increase the track density on the disk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data reproduction apparatus, disposed on a single-chip integrated circuit, comprising:
    a decoder circuit configured to receive a read signal read from any track on a disk and to decode bit-string data based on equalized-waveform data generated by equalizing a waveform of the read signal;
    a cancellation process circuit configured to cancel, from the equalized-waveform data, an interference between a signal read from a first track and a signal read from a second track adjacent to the first track;
    a calculator circuit configured to
        calculate, for a specific window, a first cancellation coefficient necessary for the cancellation process circuit to cancel the interference, and to
        calculate a second cancellation coefficient by correcting the first cancellation coefficient based on a ratio of the number of adjacent bits of opposite polarity to the number of all bits in the specific window.

2. The data reproduction apparatus of claim 1, wherein the calculator circuit is configured to
    calculate the second cancellation coefficient by multiplying the first cancellation coefficient by the reciprocal of the ratio of the number of adjacent bits of opposite polarity to the number of all bits.

3. The data reproduction apparatus of claim 2, wherein the cancellation process circuit is configured to
    cancel the interference from the equalized-waveform data based on the first cancellation coefficient or the second cancellation coefficient, and to
    output the equalized-waveform data from which the interference has been cancelled.

4. The data reproduction apparatus of claim 1, wherein the cancellation process circuit is configured to
    cancel the interference from the equalized-waveform data based on the first cancellation coefficient or the second cancellation coefficient, and to
    output the equalized-waveform data from which the interference has been cancelled.

5. The data reproduction apparatus of claim 4, further comprising a controller configured to control the cancellation process circuit, wherein the controller is configured to control the cancellation process circuit, causing the circuit to cancel the equalized-waveform data corresponding to the read signal read from the first track, based on the first cancellation coefficient, in order to set the number of bits of opposite polarities in each bit-string data; and to control the cancellation process circuit, causing the circuit to cancel the equalized-waveform data corresponding to the read signal read from the first track, based on the second cancellation coefficient, if the calculator circuit calculates the second cancellation coefficient.

6. The data reproduction apparatus of claim 5, wherein the controller is configured to control the decoder circuit, causing the same to decode second bit-string data based on the equalized-waveform data corresponds to the read signal read from the second track and to decode first bit-string data decoded by the decoder circuit based on the equalized-waveform data corresponds to the read signal read from the first track and from which interference has been canceled based on the first cancellation coefficient; and the calculator circuit is configured to count the bits of opposite polarities in the first bit-string data and also the bits of opposite polarities in the second bit-string data, and to set the number of bits counted in the first bit-string data and also the number of bits counted in the second bit-string data.

7. The reproduction apparatus of claim 6, wherein the calculator circuit is configured to compare the first bit-string data and second bit-string data in the specific window, bit by bit in terms of polarity, to set the second cancellation coefficient to zero if the bits have the same polarity, and to calculate the second cancellation coefficient by multiplying the first cancellation coefficient by the reciprocal of the ratio of the number of adjacent bits of opposite polarity to the number of all bits, if the bits have different polarities.

8. A disk storage apparatus comprising:

a data reproduction apparatus including:
 a decoder configured to receive a read signal read from any track on a disk and to decode bit-string data based on equalized-waveform data generated by equalizing a waveform of the read signal,
 a cancellation process module configured to cancel, from the equalized-waveform data, an interference between a signal read from a first track and a signal read from a second track adjacent to the first track,
 a calculator configured to
  calculate, for a specific window, a first cancellation coefficient necessary for the cancellation process module to cancel the interference, and to
  calculate a second cancellation coefficient by correcting the first cancellation coefficient based on a ratio of the number of adjacent bits of opposite polarity to the number of all bits in the specific window;

a head configured to read a read signal from any track on the disk;

a transmitter configured to transmit the read signal read by the head, from the track on the disk to the data reproduction apparatus; and a controller configured to control the head and the data reproduction apparatus.

9. The disk storage apparatus of claim 8, wherein the controller is configured to start a read retry, thereby to reproduce data again from the disk, if the data decoded by the data reproduction apparatus contains errors, and to activate the cancellation process module and the calculator, both incorporated in the data reproduction apparatus, in order to perform the read retry.

10. The disk storage apparatus of claim 8, wherein the calculator is configured to calculate the second cancellation coefficient by multiplying the first cancellation coefficient by the reciprocal of the ratio of the number of adjacent bits of opposite polarity to the number of all bits.

11. The disk storage apparatus of claim 8, wherein the cancellation process module is configured to cancel the interference from the equalized-waveform data based on the first cancellation coefficient or the second cancellation coefficient, and to output the equalized-waveform data from which the interference has been cancelled.

12. The disk storage apparatus of claim 11, further comprising a controller configured to control the cancellation process module, wherein the controller is configured to control the cancellation process module, causing the module to cancel the equalized-waveform data corresponding to the read signal read from the first track, based on the first cancellation coefficient, in order to set the number of bits of opposite polarities in each bit-string data; and to control the cancellation process module, causing the module to cancel the equalized-waveform data corresponding to the read signal read from the first track, based on the second cancellation coefficient, if the calculator calculates the second cancellation coefficient.

13. The disk storage apparatus of claim 12, wherein the controller is configured to control the decoder, causing the same to decode second bit-string data based on the equalized-waveform data corresponds to the read signal read from the second track and to decode first bit-string data decoded by the decoder based on the equalized-waveform data corresponds to the read signal read from the first track and from which interference has been canceled based on the first cancellation coefficient; and the calculator is configured to count the bits of opposite polarities in the first bit-string data and also the bits of opposite polarities in the second bit-string data, and to set the number of bits counted in the first bit-string data and also the number of bits counted in the second bit-string data.

14. The disk storage apparatus of claim 13, wherein the calculator is configured to compare the first bit-string data and second bit-string data in the specific window, bit by bit in terms of polarity, to set the second cancellation coefficient to zero if the bits have the same polarity, and to calculate the second cancellation coefficient by multiplying the first cancellation coefficient by the reciprocal of the ratio of the number of adjacent bits of opposite polarity to the number of all bits, if the bits have different polarities.

15. A method of reproducing data, implemented in a data reproduction apparatus, disposed on a single-chip integrated circuit and including reproducing data circuitry, configured to decode bit-string data based on equalized-waveform data generated by equalizing the waveform of a read signal read from any track on a disk, the method comprising:

calculating, by the reproducing data circuitry, for a specific window, a first cancellation coefficient necessary in canceling, from equalized-waveform data, interference between a read signal read from a first track and a read signal read from a second track adjacent to the first track; and calculating, by the reproducing data circuitry, a second cancellation coefficient by correcting the first cancellation coefficient based on a ratio of the number of adjacent bits of opposite polarity to the number of all bits in the specific window.

16. The method of claim 15, further comprising
calculating, by the reproducing data circuitry, the second cancellation coefficient by multiplying the first cancellation coefficient by the reciprocal of the ratio of the number of adjacent bits of opposite polarity to the number of all bits.

17. The method of claim 15, further comprising:
canceling, by the reproducing data circuitry, the interference from the equalized-waveform data based on the first cancellation coefficient or the second cancellation coefficient; and
outputting, by the reproducing data circuitry, the equalized-waveform data from which the interference has been cancelled.

18. The method of claim 17, further comprising:
controlling, by the reproducing data circuitry, to cancel the equalized-waveform data corresponding to the read signal read from the first track, based on the first cancellation coefficient, in order to set the number of bits of opposite polarities in each bit-string data; and
controlling, by the reproducing data circuitry, to cancel the equalized-waveform data corresponding to the read signal read from the first track, based on the second cancellation coefficient, if the calculating calculates the second cancellation coefficient.

19. The method of claim 18, further comprising:
decoding, by the reproducing data circuitry, second bit-string data based on the equalized-waveform data corresponding to the read signal read from the second track;
decoding, by the reproducing data circuitry, first bit-string data decoded based on the equalized-waveform data corresponds to the read signal read from the first track and from which interference has been canceled based on the first cancellation coefficient;
counting, by the reproducing data circuitry, the bits of opposite polarities in the first bit-string data and also the bits of opposite polarities in the second bit-string data; and
setting, by the reproducing data circuitry, the number of bits counted in the first bit-string data and also the number of bits counted in the second bit-string data.

20. The method of claim 19, further comprising:
comparing, by the reproducing data circuitry, the first bit-string data and second bit-string data in the specific window, bit by bit in terms of polarity;
setting, by the reproducing data circuitry, the second cancellation coefficient to zero if the bits have the same polarity; and
calculating, by the reproducing data circuitry, the second cancellation coefficient by multiplying the first cancellation coefficient by the reciprocal of the ratio of the number of adjacent bits of opposite polarity to the number of all bits, if the bits have different polarities.

* * * * *